United States Patent [19]
Billovits et al.

[11] Patent Number: 5,877,271
[45] Date of Patent: Mar. 2, 1999

[54] FINISHING PROCESS FOR SYNDIOTACTIC VINYL AROMATIC POLYMERS

[75] Inventors: Gerald F. Billovits; Scott A. Tipler, both of Midland, Mich.; Thomas W. McCullough, Lake Jackson, Tex.

[73] Assignee: The Dow Chemical Company, Midland, Mich.

[21] Appl. No.: 16,815

[22] Filed: Jan. 30, 1998

Related U.S. Application Data

[60] Provisional application No. 60/044,688 Apr. 18, 1997.
[51] Int. Cl.⁶ .................. C08F 6/00; C08F 12/04
[52] U.S. Cl. .................. 528/503; 528/481; 528/501; 159/47.1; 264/345
[58] Field of Search .................. 264/345; 528/481, 528/501, 503; 526/346; 159/47.1

[56] References Cited

U.S. PATENT DOCUMENTS 5,357,014  10/1994  Uchida et al. .................. 528/481 X
5,698,652  12/1997  Aoyama et al. .................. 526/347.1 X

FOREIGN PATENT DOCUMENTS

Hei 3-56504  3/1991  Japan .
Hei 3-64303  3/1991  Japan .

*Primary Examiner*—Fred Teskin

[57] ABSTRACT

The present invention is an improvement in a solid state devolatilization finishing process for a wet feed material of syndiotactic vinyl aromatic polymer containing volatiles, including at least one vinyl aromatic monomer, wherein the improvement comprises: rapidly heating the wet feed material, such that the temperature of the wet feed material is increased at a rate of at least 10° C./min., to a temperature between about 150° C. and the melting point temperature of the syndiotactic vinyl aromatic polymer, while concurrently removing evolved volatiles.

12 Claims, No Drawings

FINISHING PROCESS FOR SYNDIOTACTIC VINYL AROMATIC POLYMERS

CROSS-REFERENCE STATEMENT

This application claims the benefit of U.S. provisional application No. 60/044,688, filed Apr. 18, 1997.

BACKGROUND OF THE INVENTION

The process of the present invention relates to methods of producing syndiotactic vinyl aromatic polymers.

In the production of syndiotactic vinyl aromatic polymers such as syndiotactic polystyrene (SPS), a devolatilization finishing step is required to remove residual monomers, process solvents, and other volatile components from the SPS polymer. Residual vinyl aromatic and other monomers can autopolymerize upon heating to form atactic vinyl aromatic and other polymers which are undesirable contaminants in SPS polymers. The presence of atactic vinyl aromatic polymers in SPS polymers adversely affects product properties such as the heat distortion temperature and crystallization rate of the SPS homopolymers and copolymers.

JP 03056504 by Yamamoto discloses a melt devolatilization finishing step, wherein wet SPS powder containing volatiles is fed to a twin screw extruder, where it is melted and devolatilized by passage through one or more vacuum vents. However, extrusion devolatilization processes have limited capacity, higher equipment costs and are more difficult to scale to a commercial level when compared to solid state devolatilization processes.

JP 03064303 by Yamamoto discloses a solid state devolatilization finishing step, wherein wet SPS powder containing volatiles is predried at a temperature between the glass transition temperature, (typically about 100° C.) and the melting point of SPS, and further devolatilized by melt devolatilization in a vacuum vented twin screw extruder as described in JP 03056504, above. However, Yamamoto discloses long residence times (9 or 10 hours) indicating low heating rates of the SPS powder which can result in the formation of significant quantities of atactic vinyl aromatic polymer.

Therefore, there remains a need for a method of removing volatiles and residual monomer(s) from syndiotactic vinyl aromatic polymers while minimizing the amount of atactic vinyl aromatic polymers produced.

SUMMARY OF THE INVENTION

The present invention is an improvement in a solid state devolatilization finishing process for a wet feed material of syndiotactic vinyl aromatic polymer containing volatiles including at least one vinyl aromatic monomer, wherein the improvement comprises:

rapidly heating the wet feed material, such that the temperature of the wet feed material is increased at a rate of at least 10° C./min., to a temperature between about 150° C. and the melting point temperature of the syndiotactic vinyl aromatic polymer, while concurrently removing evolved volatiles.

It has been found that rapid initial heating of wet syndiotactic vinyl aromatic polymer powder surprisingly leads to reductions in the level of atactic vinyl aromatic polymer formed when compared to heating at lower rates as previously practiced in solid state devolatilization processes.

DESCRIPTION OF THE PREFERRED EMBODIMENTS

In one embodiment, the present invention is an improved process for finishing syndiotactic vinyl aromatic polymers.

As used herein, the term "syndiotactic" refers to polymers having a stereoregular structure of greater than 90 percent syndiotactic, preferably greater than 95 percent syndiotactic, of a racemic triad as determined by $^{13}C$ nuclear magnetic resonance spectroscopy.

Vinyl aromatic polymers are homopolymers and copolymers of vinyl aromatic monomers, that is, monomers whose chemical structure possesses both an unsaturated moiety and an aromatic moiety. The preferred vinyl aromatic monomers have the formula

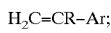

$H_2C=CR-Ar$;

wherein R is hydrogen or an alkyl group having from 1 to 4 carbon atoms, and Ar is an aromatic radical of from 6 to 10 carbon atoms. Examples of such vinyl aromatic monomers are styrene, alpha-methylstyrene, ortho-methylstyrene, meta-methylstyrene, para-methylstyrene, vinyl toluene, para-t-butylstyrene, vinyl naphthalene, divinylbenzene and the like. Syndiotactic polystyrene is the currently preferred syndiotactic vinyl aromatic polymer. Typical polymerization processes for producing syndiotactic vinyl aromatic polymers are well known in the art and are described in U.S. Pat. Nos. 4,680,353, 5,066,741, 5,206,197 and 5,294,685, which are incorporated herein by reference.

During polymerization of the vinyl aromatic monomer, the polymerization reaction is not typically carried to completion and a mixture of syndiotactic vinyl aromatic polymer and volatiles, such as residual monomers and process solvents, is produced. This mixture typically contains from about 2 to about 99 percent solid, non-volatile, high molecular weight polymer, preferably from about 30 to about 95 percent, more preferably from about 40 to about 95 percent, and most preferably from about 70 to about 95 percent by weight based on the total weight of the mixture. The polymer can then be recovered from this mixture using a finishing process such as devolatilization to produce resins which are useful for forming injection molded articles, films, fibers, etc. The process of the present invention is an improved process for devolatilizing the syndiotactic vinyl aromatic polymer/volatile mixture, hereafter referred to as wet feed mixture.

The wet feed mixture is typically discharged from a polymerization reactor, polymer recovery system or deashing step at a temperature below 120° C., typically at a temperature between about 10° and about 90° C. This mixture is then rapidly heated in a devolatilization apparatus to a temperature between about 150° C. and the melting temperature of the syndiotactic vinyl aromatic polymer, which is generally from about 200° to about 320° C. Typically the mixture is rapidly heated to a temperature between about 160° and 300° C., preferably between 180 and 290° C., more preferably between 200° and 280° C. and most preferably between about 220 and 270° C. In a preferred embodiment, the mixture is heated to a temperature which is approximately 20° C. below the melting temperature of the fully dried polymer.

Rapid heating is generally accomplished in an apparatus capable of increasing the temperature of the wet feed material at an average rate of at least 10° C./min., typically from 10° to 1000° C./min., preferably at least 20° C./min, more preferably at least 30° C./min., and most preferably at least 40° C./min. These heating rates can be achieved by any method which will increase the temperature of the wet feed material as desired. For example, such rates can be achieved by heating a thin layer of polymer powder over a large surface area, especially when this layer is turned over frequently or is highly turbulent; thus the temperature of the polymer powder can be increased at a higher rate. By increasing the temperature of the wet feed material at a faster rate, it has been discovered that the residual monomer is more likely to diffuse out of the polymer and vaporize rather than polymerize, thus less atactic vinyl aromatic polymer is formed.

In order to prevent excessive atactic polymer formation, rapid heating must also be accompanied by a concurrent means of volatiles removal, wherein the volatiles include vinyl aromatic monomer vapor. Exemplary methods include those well known in the art such as applying vacuum and the use of an inert gas purge. Vaporized volatiles can then be condensed for recovery and reuse.

The residence time in the devolatilization apparatus should be sufficient to reduce the residual vinyl aromatic monomer content in the devolatilized product from the initial value in the wet feed mixture, typically 5 to 60 weight percent, to below 3 percent by weight, preferably less than 1 percent by weight, more preferably less than 1000 ppm, and most preferably less than 800 ppm based on the weight of the devolatilized polymer. The residence time needed in the devolatilization apparatus is dependent upon the volatiles content of the wet feed mixture, the temperature to which the wet feed mixture can be heated without difficulties associated with significant melting or agglomeration, the level of vacuum or the purge gas rate used in the removal of volatiles, and the physical characteristics of the wet feed mixture. Generally, the devolatilization is conducted under conditions such that the residence time needed to achieve the residual vinyl aromatic monomer content recited above is 2 hours or less, typically 1 hour or less, preferably 30 minutes or less, more preferably 15 minutes or less and most preferably 10 minutes or less.

Any means of heating in the devolatilization apparatus can be used which will rapidly heat the wet feed mixture as described in the present invention. Examples of such heating means include but are not limited to indirect dryers where the feed material is in contact with a metal surface heated by a heat transfer fluid circulated through a jacket, for example high speed paddle-type dryer, kinetic energy heating using plow-type mixer/dryer augmented by high speed choppers, pneumatically conveyed hammer mills or batchwise operated mixer/homogenizers utilizing high speed agitators, direct dryers, for example fluid bed dryers which utilize a hot gas stream for heating, especially a centrifugal fluid bed dryer, conventional dryer/heater devices augmented with auxiliary heating technology, such as radiant infrared heating or microwave heating or similar technology and combinations thereof.

If necessary, following the initial rapid heating and volatiles removal from the wet feed mixture as described above, the devolatilized product containing less than 3 wt. percent residual vinyl aromatic monomer, can be further devolatilized by other solid state or melt devolatilization devices in order to further reduce residual volatile contents. Some examples of secondary solid state devolatilization devices are various direct and indirect heated dryers or an insulated, inert gas purged, mass flow hopper or storage silo. Examples of secondary melt devolatilization devices include vacuum vented single and twin screw extruders. These units can also be used in producing formulated products by mixing in additives such as antioxidants, processing aids, impact modifiers, flame retardants, fillers such as fiberglass or various minerals, or other polymeric materials to form blends or alloys.

Typically, the syndiotactic vinyl aromatic polymers produced in accordance with the present invention have a weight average molecular weight (Mw) of at least 15,000, preferably at least 50,000, and most preferably from 150,000 to 500,000. These polymers typically contain less than 4.5 wt. percent atactic vinyl aromatic polymer, preferably less than 4 wt. percent, more preferably less than 3.5 wt. percent, and most preferably less than 3 wt. percent.

Residual vinyl aromatic monomer content can be determined using headspace gas chromatography with an appropriate solvent, for example orthodichlorobenzene, by reference to samples of known composition. Atactic polymer content can be determined by Soxhlet extraction using methyl ethyl ketone, which is a solvent for atactic vinyl aromatic polymers, and a non-solvent for crystalline, syndiotactic vinyl aromatic homopolymers and copolymers. These methods are well known by those skilled in the art.

Surprisingly, by rapidly heating the wet feed mixture, at a rate of at least 10° C./min., to a temperature between 150° C. and the melting point temperature of the syndiotactic vinyl aromatic polymer, while removing evolved volatiles, the levels of residual vinyl aromatic monomer and other volatiles are reduced while minimizing the production of atactic vinyl aromatic polymers.

The following examples are provided to illustrate the present invention. The examples are not intended to limit the scope of the present invention and they should not be so interpreted. Amounts are in weight parts or weight percentages unless otherwise indicated.

EXAMPLE 1

SPS homopolymer powder at approximately 25° C. and containing 25 percent by weight volatile components (less than 1 percent by weight atactic polystyrene) is fed continuously into a Solidaire™ dryer (model SJS 8-4, made by Hosokawa Bepex Corp.) having a feed zone jacket temperature of 220° C., a product discharge zone jacket temperature of 250° C., a countercurrent nitrogen gas flow having an inlet temperature of 220° C., and an agitator rotational speed of 460 rpm, for a residence time between about 4 and 5 minutes. The polymer is then analyzed for styrene monomer (SM) using headspace gas chromatography and atactic polystyrene (APS) content using Soxhlet extraction. The following results are obtained:

| Run Number | Feed Rate (kg/hr) | $N_2$ Rate ($m^3$/min.) | Discharge Temp.[1](°C.) | Average Heating Rate (°C./min.) | $SM^2$ Content (ppm) | $APS^3$ Content (% by wt.) |
|---|---|---|---|---|---|---|
| 1 | 45.5 | 0.28 | 226 | 41.2 | 410 | 1.2 |
| 2 | 91 | 0.57 | 215 | 48.8 | 1070 | 1.6 |

[1]The Discharge temperature is the temperature of the polymer powder at the discharge outlet.
[2]SM is styrene monomer.
[3]APS is atactic polystyrene.

This data shows the reduced volatiles level in SPS homopolymer powder while minimizing the formation of atactic polystyrene.

EXAMPLE 2

SPS homopolymer powder (225g) at approximately 25° C. and containing about 20 percent by weight volatile components and less than 1 percent atactic polystyrene is charged to a Draiswerke Gelimat™ (Model G1S) processor having a 1.0 liter cylindrical chamber, an axially mounted shaft with attached paddles, a short pitched screw at one end for delivering the feed charge into the processing chamber and a variable speed AC drive. Vacuum suction (40 mmHg) is applied to the feed chute immediately after the charge is dropped on the feed screw. The processing chamber is continuously swept by a 0.014 m$^3$/min. Nitrogen purge stream. The SPS feed is heated by kinetic energy supplied by the rotating paddles. The devolatilized polymer is then analyzed for styrene and atactic polystyrene content. Table 2 summarizes the processing parameters and devolatilization results.

TABLE 2

| Sample | Processing Time (sec.) | Rotor Speed (rpm) | Discharge Temp. (°C.) | Avg. Heating Rate (°C./min.) | SM Content (ppm) | APS content (% by wt.) |
|---|---|---|---|---|---|---|
| FEED | | | | | 141,460 | 1.3 |
| A | 19 | 6700 | 204 | 581 | 15,620 | 1.5 |
| B | 32 | 6700 | 232 | 398 | 15,320 | 2.1 |
| C | 90 | 5500 | 232 | 141 | 3400 | 2.4 |

As seen above, the residual styrene content is substantially reduced with very rapid heating of the polymer powder and short residence times resulting in a reduction in the formation of atactic polystyrene.

EXAMPLE 3

A syndiotactic vinyl aromatic copolymer at approximately 15° C. and consisting of 96 mole percent styrene and 4 mole percent p-methylstyrene, containing 25 percent volatile components and less than 1 percent atactic polymer, is fed continuously at a rate of 27 kg/hr to a finishing process consisting of a Solidaire™ dryer (model SJS 8-4, made by Hosokawa Bepex Corp.) as in Example 1, followed by a Werner & Pfleiderer ZSK-30 twin screw extruder, with L/D=37, equipped with two high vacuum (5 to 10 mm. Hg) vents. The dryer is operated with a feed zone jacket temperature of 175° C., a discharge zone jacket temperature of 230° C., a countercurrent Nitrogen gas flow of 0.34 m$^3$/min with an inlet temperature of 260° C., and a rotor speed of 450 rpm. The extruder barrel set point temperatures range from 150 to 280° C. and the extruder screw speed is 275 rpm. The powdered polymer is first devolatilized for approximately 5 minutes in the Solidaire dryer and then further devolatilized in the extruder and formed into pellets. The pelletized resin produced by this process has a residual styrene level of 650 ppm and an atactic polymer content of 2.7 wt. percent.

The process of the present invention allows for the production of extruded products having low atactic polymer content.

EXAMPLE 4

A syndiotactic vinyl aromatic copolymer at approximately 15° C. and consisting of 93 mole percent styrene and 7 mole percent p-methylstyrene, containing 26 percent volatile components and less than 1 percent atactic polymer, is fed continuously at a rate of 27.5 kg/hr to a finishing process consisting of a Solidaire™ dryer (model SJS 8-4, made by Hosokawa Bepex Corp.), followed by a Werner & Pfleiderer ZSK-30 twin screw extruder, as in Example 3. The dryer is operated with a feed zone jacket temperature of 172° C., a discharge zone jacket temperature of 221° C., a countercurrent Nitrogen gas flow of 0.34 m$^3$/min. with an inlet temperature of 250° C., and a rotor speed of 375 rpm. The extruder barrel set point temperatures range from 150 to 250° C. and the extruder screw speed is 350 rpm. The powdered polymer is first devolatilized in the Solidaire dryer and then further devolatilized and extruded into pellets. The pelletized resin produced by this process had a residual styrene level of 510 ppm and an atactic polymer content of 2.3 wt. percent.

The process of the present invention allows for the production of extruded copolymers having a low atactic polymer content.

Comparative Example 1

SPS homopolymer powder (2.12 kg) containing about 25 wt. percent volatile components and 1.8 wt. percent atactic polystyrene is charged to a low speed paddle-type dryer (Discotherm™ B, Model DTB3, manufactured by LIST, Inc.). The unit has a total volume of 6.9 liters and a total surface area for heat transfer of 0.29 m$_2$. It is heated by hot oil circulating through the jacket surrounding the cylindrical main chamber at 208° C. and the agitator rotates at a speed of 42 rpm. Volatiles are conveyed out of the unit by application of vacuum (30–45 mm Hg). Monitoring of the product temperature using a thermocouple inserted in the polymer powder shows heating from 20° C. to 150° C. at an average rate of 8.6° C./min. After a residence time of 30 minutes, the unit is opened and the SPS powder is analyzed for residual styrene monomer and atactic polystyrene. The SPS powder contains 1070 ppm of residual styrene monomer and 4.9 weight percent atactic polystyrene.

Note the significant increase in the amount of atactic polystyrene due to the slow initial heating rate, even when using longer residence times.

Comparative Example 2

A syndiotactic vinyl aromatic copolymer at approximately 15° C. and consisting of 98 mole percent styrene and 2 mole percent p-methylstyrene, containing 20 percent volatile components and less than 1 percent atactic polymer is fed continuously at a rate of 23 kg/hr into a disc-type indirect dryer (TorusDisc™, model TDS 26-11, made by Hosokawa Bepex Corp.). The dryer is heated by hot oil circulating through the agitator with integral plates at a temperature of 188° C. and the agitator rotates at a fixed speed of 13.5 rpm. Nitrogen gas, preheated to a temperature of 118° C., is introduced to the unit at seven separate points below the powder level, at a total flow rate of 0.53 m$^3$/min. After a mean residence time of about 17 hours, the exiting dried powder has a residual styrene level of 3220 ppm and an atactic polystyrene content of 4.7 percent.

Although the heat transfer surface of this dryer is enhanced by the integral discs on the rotor, it is known to have reduced heating rates (below 10° C./min.) which necessitates long residence times, resulting in increased atactic polystyrene production.

Comparative Example 3

A syndiotactic vinyl aromatic copolymer at approximately 15° C. and consisting of 96 mole percent styrene and 4 mole percent p-methylstyrene, containing 29 percent volatile components and less than 1 percent atactic polymer, is fed continuously at a rate of 25 kg/hr to a finishing process consisting of a TorusDisc™ dryer (model TDS 26-11, made by Hosokawa Bepex Corp.) as in Comparative Example 2, followed by a Werner & Pfleiderer ZSK-30 twin screw extruder, with L/D=37, equipped with two high vacuum (5 to 10 mm. Hg) vents. The dryer is operated with a hot oil temperature of 172° C. circulating through the agitator, which turns at a fixed speed of 13.5 rpm. Nitrogen gas, preheated to a temperature of 150° C., is introduced to the dryer at seven separate points below the powder level at a total flow rate of 0.63 m³/min. The extruder barrel set point temperatures range from 150 to 270° C. and the extruder screw speed is 375 rpm. The powdered polymer is first devolatilized in the TorusDisc™ dryer where it achieves a temperature of about 170° C. and is then further devolatilized and extruded into pellets. The pelletized resin produced by this process had a residual styrene level of 570 ppm and an atactic polymer content of 5.5 percent.

Note the high amount of atactic polymer content even when coupled with further devolatilization after heating in a TorusDisc™ dryer which is known to have low heating rates and long residence times.

Syndiotactic vinyl aromatic polymers produced by the process of the present invention, wherein the polymer powder is heated at a rate of at least 10° C./min., contain low residual styrene monomer and less than 3 weight percent atactic polystyrene.

What is claimed is:

1. An improvement in a solid state devolatilization finishing process for a wet feed material of syndiotactic vinyl aromatic polymer containing volatiles, including at least one vinyl aromatic monomer, wherein the improvement comprises:

rapidly heating the wet feed material, such that the temperature of the wet feed material is increased at a rate of at least 10° C./min., to a temperature between about 150° C. and the melting point temperature of the syndiotactic vinyl aromatic polymer, while concurrently removing evolved volatiles.

2. The process of claim 1 wherein the syndiotactic vinyl aromatic polymer is syndiotactic polystyrene.

3. The process of claim 1 wherein the syndiotactic vinyl aromatic polymer is a copolymer of a vinyl aromatic monomer selected from the group consisting of styrene, para-methylstyrene, and para-t-butylstyrene.

4. The process of claim 1 wherein the devolatilized polymer produced contains less than 1000 ppm residual vinyl aromatic monomer.

5. The process of claim 4 wherein the devolatilized polymer produced contains less than 800 ppm residual vinyl aromatic monomer.

6. The process of claim 1 wherein the devolatilized polymer produced contains less than 3 weight percent atactic vinyl aromatic polymer.

7. The process of claim 1 wherein the devolatilization finishing process is followed by a further devolatilization process.

8. The process of claim 7 wherein the further devolatilization process is conducted in an extruder.

9. The process of claim 7 wherein the further devolatilization process is conducted in a secondary dryer.

10. The process of claim 1 wherein the heating rate of the wet feed material is at least 40° C./min.

11. The process of claim 1 wherein the heating rate of the wet feed material is at least 20° C./min.

12. The process of claim 1 wherein the heating rate of the wet feed material is at least 30° C./min.

* * * * *